US012619394B2

(12) United States Patent
Lee

(10) Patent No.: US 12,619,394 B2
(45) Date of Patent: May 5, 2026

(54) METHOD OF PERFORMING HARDWARE EFFICIENT UNBIASED ROUNDING OF A NUMBER

(71) Applicant: Imagination Technologies Limited, Kings Langley (GB)

(72) Inventor: Timothy Lee, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 1088 days.

(21) Appl. No.: 17/693,658

(22) Filed: Mar. 14, 2022

(65) Prior Publication Data

US 2022/0334799 A1 Oct. 20, 2022

(30) Foreign Application Priority Data

Mar. 12, 2021 (GB) ...................................... 2103491

(51) Int. Cl.
*G06F 7/499* (2006.01)
*G06F 5/01* (2006.01)
(52) U.S. Cl.
CPC .......... *G06F 7/49963* (2013.01); *G06F 5/012* (2013.01)
(58) Field of Classification Search
CPC .......................... G06F 7/49947; G06F 7/49963
See application file for complete search history.

(56) References Cited

U.S. PATENT DOCUMENTS 5,424,967 A 6/1995 Lee
6,078,941 A * 6/2000 Jiang ........................ G06F 7/544
708/650

(Continued)

FOREIGN PATENT DOCUMENTS

EP 0655675 A1 5/1995

OTHER PUBLICATIONS

J. Hormigo and J. Villalba, "Measuring Improvement When Using HUB Formats to Implement Floating-Point Systems Under Round-to-Nearest," in IEEE Transactions on Very Large Scale Integration (VLSI) Systems, vol. 24, No. 6, pp. 2369-2377, Jun. 2016, doi: 10.1109/TVLSI.2015.2502318. (Year: 2016).*

(Continued)

*Primary Examiner* — James Trujillo
*Assistant Examiner* — Markus Anthony Villanueva
(74) *Attorney, Agent, or Firm* — Potomac Law Group, PLLC; Vincent M DeLuca

(57) ABSTRACT

A method and hardware for performing hardware efficient unbiased rounding of a number includes receiving the number in a binary format having a first portion and a second portion. The first portion comprises bits of the number above a rounding point and the second portion comprises bits of the number after the rounding point. The method includes adding a first amount to the number to obtain a first value. Further the method comprises determining if the bit above the rounding point for a controlling value is '0' bit or a '1' bit. The controlling value is either the received number in the binary format or the first value. The method further includes adding a second amount to 'b+1' LSBs of the first value to obtain a second value if the bit above the rounding point for the controlling value is a '0' bit and rounding the number by truncating the last b bits of the second value or the last b bits of the first value based on the determination.

20 Claims, 8 Drawing Sheets

(56) References Cited

U.S. PATENT DOCUMENTS

| 8,972,472 | B2 * | 3/2015 | Kanter | G06F 7/49963 |
| | | | | 708/551 |
| 10,338,889 | B2 * | 7/2019 | Nystad | G06F 7/49947 |
| 11,449,574 | B2 * | 9/2022 | Lie | G06F 7/582 |
| 2010/0131580 | A1 * | 5/2010 | Kanter | G06F 7/49963 |
| | | | | 708/553 |
| 2015/0186111 | A1 * | 7/2015 | Quinnell | H03M 7/24 |
| | | | | 708/205 |
| 2016/0098248 | A1 * | 4/2016 | Carlough | G06F 7/49915 |
| | | | | 708/201 |
| 2019/0332355 | A1 * | 10/2019 | Tinker | G06F 7/49947 |
| 2020/0133633 | A1 * | 4/2020 | Yoshinaga | G06F 7/556 |

OTHER PUBLICATIONS

E. Lange, "Implementation and Test of the ACRITH Facility in a System/370," in IEEE Transactions on Computers, vol. C-36, No. 9, pp. 1088-1096, Sep. 1987, doi: 10.1109/TC.1987.5009539. (Year: 1987).*

Even et al., "A Dual Precision IEEE Floating-Point Multiplier," Integration, the VLSI Journal, vol. 29, 2000, pp. 167-180.

Koren, "Binary Floating-Point Numbers," Computer Arithmetic Algorithms, 2001, A.K. Peters, Ltd, Chapter 4, pp. 53-92.

* cited by examiner

100

| values | Decimal Number | Binary number N | N+half | Truncated binary number | Integer |
|---|---|---|---|---|---|
| 1 | 7.00 | 0111.00 | 0111.10 | 0111 | 7 |
| 2 | 7.25 | 0111.01 | 0111.11 | 0111 | 7 |
| 3 | 7.5 | 0111.10 | 1000.00 | 1000 | 8 |
| 4 | 7.75 | 0111.11 | 1000.01 | 1000 | 8 |
| Average | 7.375 | | | | 7.5 |

200

| values | Decimal Number | Binary Number N | N+ quarter (Q) | Q + quarter if "Q is odd" | Truncated binary number | integer |
|---|---|---|---|---|---|---|
| 1 | 7.00 | 0111.00 | 0111.01 | 0111.10 | 0111 | 7 |
| 2 | 7.25 | 0111.01 | 0111.10 | 0111.11 | 0111 | 7 |
| 3 | 7.5 | 0111.10 | 0111.11 | 1000.00 | 1000 | 8 |
| 4 | 7.75 | 0111.11 | 1000.00 | 1000.00 | 1000 | 8 |
| 5 | 8.00 | 1000.00 | 1000.01 | 1000.01 | 1000 | 8 |
| 6 | 8.25 | 1000.01 | 1000.10 | 1000.10 | 1000 | 8 |
| 7 | 8.5 | 1000.10 | 1000.11 | 1000.11 | 1000 | 8 |
| 8 | 8.75 | 1000.11 | 1001.00 | 1001.01 | 1001 | 9 |
| Average | 7.875 | | | | | 7.875 |

300

400

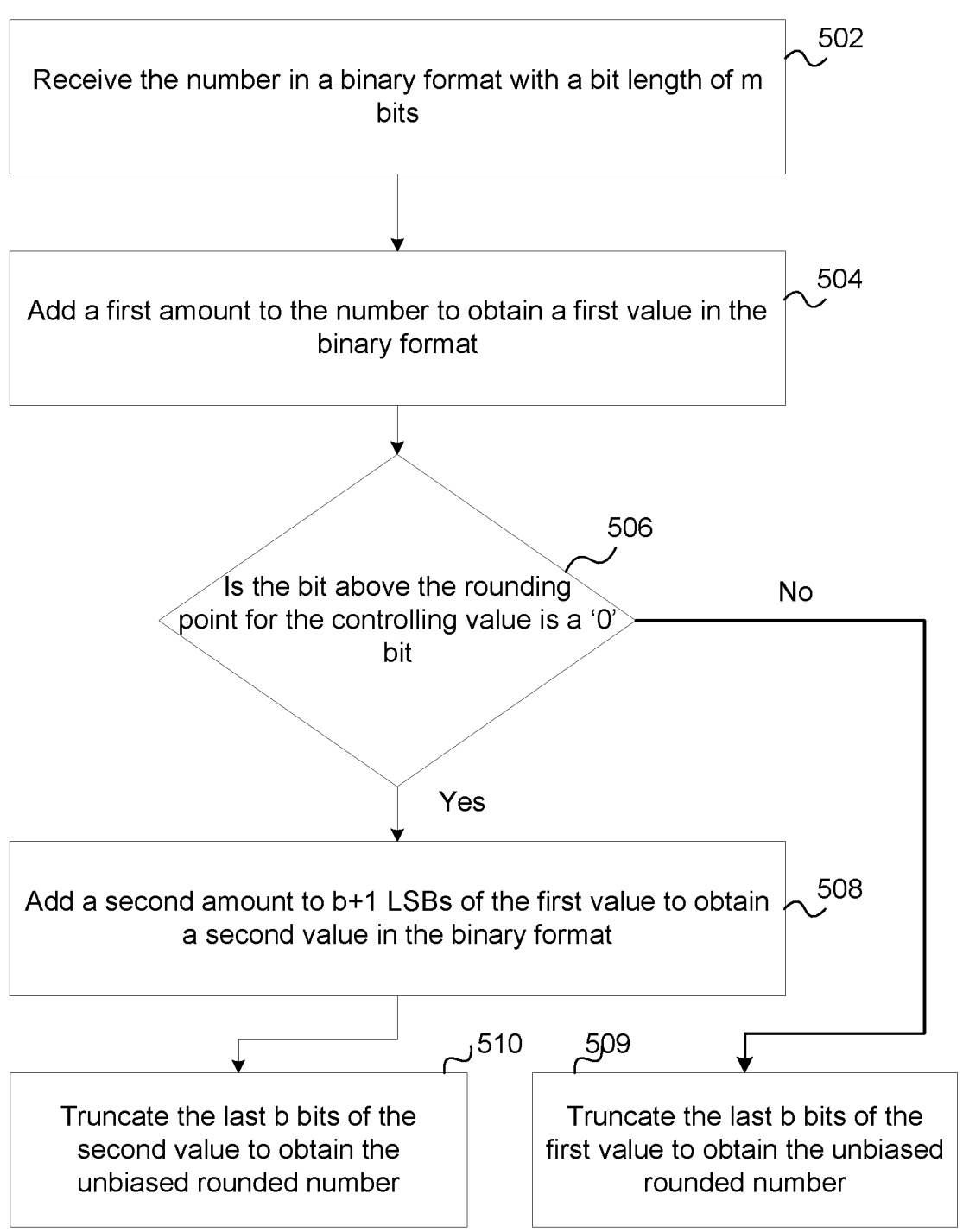

502

Receive the number in a binary format with a bit length of m bits

504

Add a first amount to the number to obtain a first value in the binary format

506

Is the bit above the rounding point for the controlling value is a '0' bit

No

Yes

508

Add a second amount to b+1 LSBs of the first value to obtain a second value in the binary format

510

Truncate the last b bits of the second value to obtain the unbiased rounded number

509

Truncate the last b bits of the first value to obtain the unbiased rounded number

FIG. 5A

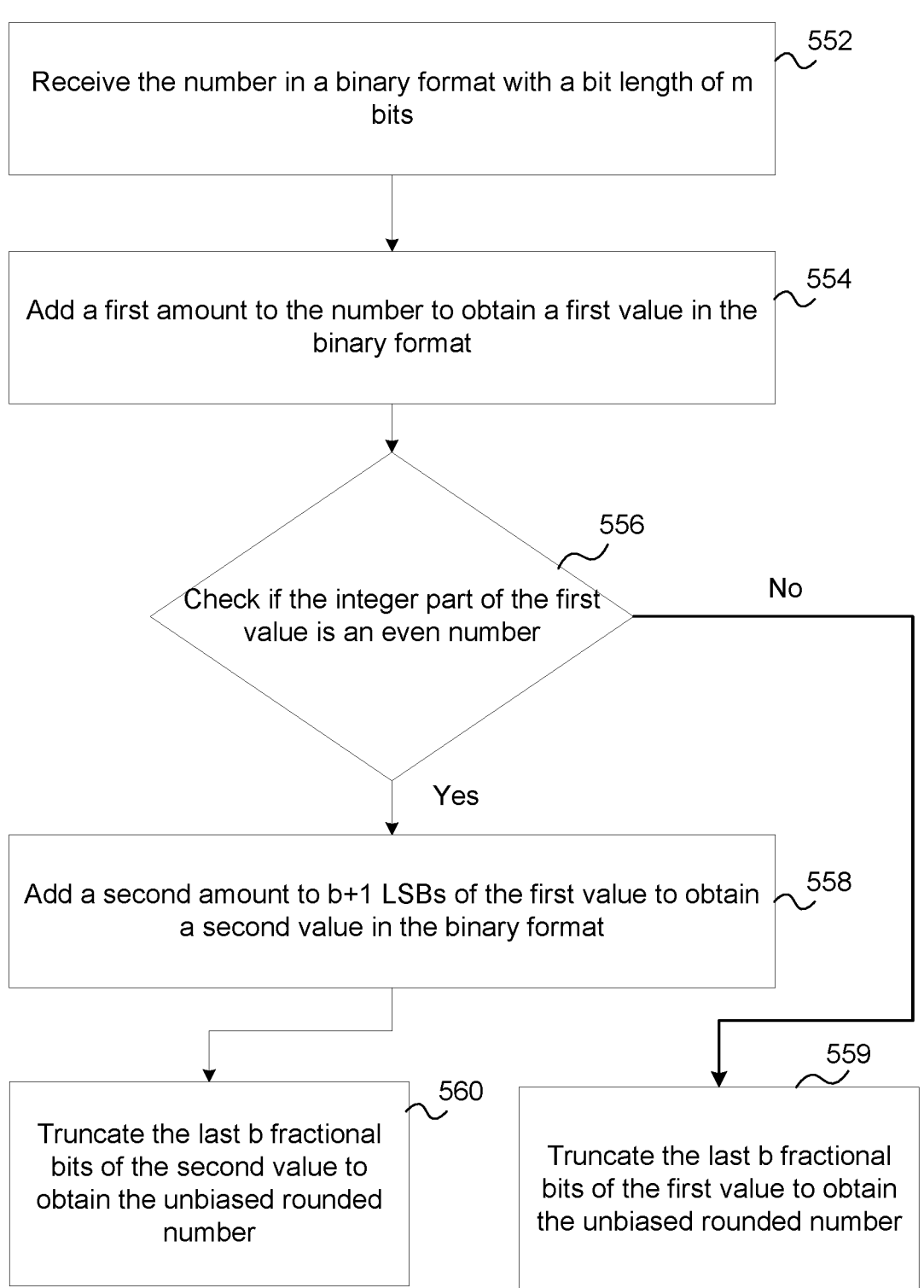

Receive the number in a binary format with a bit length of m bits ⟋552

Add a first amount to the number to obtain a first value in the binary format ⟋554

Check if the integer part of the first value is an even number ⟋556

No

Yes

Add a second amount to b+1 LSBs of the first value to obtain a second value in the binary format ⟋558

Truncate the last b fractional bits of the second value to obtain the unbiased rounded number ⟋560

Truncate the last b fractional bits of the first value to obtain the unbiased rounded number ⟋559

| Values | Decimal number N | Binary number N | First value V (N+F) | Second value U (V+S) | Truncate | Rounded number |
|---|---|---|---|---|---|---|
| 1 | 7.00 | 0111.00 | 0111.01 | 0111.01 | 0111 | 7 |
| 2 | 7.25 | 0111.01 | 0111.10 | 0111.10 | 0111 | 7 |
| 3 | 7.5 | 0111.10 | 0111.11 | 0111.11 | 0111 | 7 |
| 4 | 7.75 | 0111.11 | 1000.00 | 1000.01 | 1000 | 8 |
| 5 | 8.00 | 1000.00 | 1000.01 | 1000.10 | 1000 | 8 |
| 6 | 8.25 | 1000.01 | 1000.10 | 1000.11 | 1000 | 8 |
| 7 | 8.5 | 1000.10 | 1000.11 | 1001.00 | 1001 | 9 |
| 8 | 8.75 | 1000.11 | 1001.00 | 1001.00 | 1001 | 9 |
| Average | 7.875 | | | | | 7.875 |

800

| Values | Decimal number N | Binary number N | First Value V (N+ F) | Second Value U (V+S) if "even" | Truncate | Rounded integer |
|---|---|---|---|---|---|---|
| 1 | 7.00 | 0111.000 | 0111.011 | 0111.011 | 0111 | 7 |
| 2 | 7.125 | 0111.001 | 0111.100 | 0111.100 | 0111 | 7 |
| 3 | 7.25 | 0111.010 | 0111.101 | 0111.101 | 0111 | 7 |
| 4 | 7.375 | 0111.011 | 0111.110 | 0111.110 | 0111 | 7 |
| 5 | 7.5 | 0111.100 | 0111.111 | 0111.111 | 0111 | 7 |
| 6 | 7.625 | 0111.101 | 1000.000 | 1000.001 | 1000 | 8 |
| 7 | 7.75 | 0111.110 | 1000.001 | 1000.010 | 1000 | 8 |
| 8 | 7.875 | 0111.111 | 1000.010 | 1000.011 | 1000 | 8 |
| 9 | 8.00 | 1000.000 | 1000.011 | 1000.100 | 1000 | 8 |
| 10 | 8.125 | 1000.001 | 1000.100 | 1000.101 | 1000 | 8 |
| 11 | 8.25 | 1000.010 | 1000.101 | 1000.110 | 1000 | 8 |
| 12 | 8.375 | 1000.011 | 1000.110 | 1000.111 | 1000 | 8 |
| 13 | 8.5 | 1000.100 | 1000.111 | 1001.000 | 1001 | 9 |
| 14 | 8.625 | 1000.101 | 1001.000 | 1001.000 | 1001 | 9 |
| 15 | 8.75 | 1000.110 | 1001.001 | 1001.001 | 1001 | 9 |
| 16 | 8.875 | 1000.111 | 1001.010 | 1001.010 | 1001 | 9 |
| Average | 7.875 | | | | | 7.875 |

900

| Values | Decimal number N | Binary number N | Second value U (N+S) if "even" | Truncate | Rounded number |
|--------|------------------|-----------------|-------------------------------|----------|----------------|
| 1 | 7.0 | 0111.0 | 0111.0 | 0111 | 7 |
| 2 | 7.5 | 0111.1 | 0111.1 | 0111 | 7 |
| 3 | 8.0 | 1000.0 | 1000.1 | 1000 | 8 |
| 4 | 8.5 | 1000.1 | 1001.0 | 1001 | 9 |
| Average | 7.75 | | | | 7.75 |

METHOD OF PERFORMING HARDWARE EFFICIENT UNBIASED ROUNDING OF A NUMBER

TECHNICAL FIELD

The application relates to rounding a number.

BACKGROUND

Rounding is a process of replacing a precise number with an approximate value having a shorter, simpler, or more explicit representation. Often rounding is performed in real life for making calculations simple. It is also used in electronic or computer systems to make a number suitable for performing various calculations. Electronic and computer systems use numbers in different binary number formats such as floating point numbers or fixed point numbers which have a finite number of digits for representing the number. While using such formats, often calculation with precise numbers is not possible or in other words, rounding or approximation of numbers becomes unavoidable.

There are many known techniques or methods of performing rounding. Some of the method includes Rounding Up, Rounding Down, Rounding Towards Zero, Rounding Away from Zero, Rounding Towards Infinity, Rounding Away from Infinity, Rounding Towards Even Number and the like. Some of these are explained in detail in the sections below. The rounding or approximation of a number to another number introduces an error commonly referred to as a round-off error or rounding error. In a sequence of calculations, these rounding errors generally accumulate, and in certain cases, these errors make the final results meaningless. For example, when considering some electronic systems such as a Finite Impulse Response (FIR) filter in an image processing system, the accumulation of the rounding error may have a considerable effect on the colour of the pixels generated as an output on a display unit.

The methods of rounding numbers mentioned above variously generate either a biased or unbiased result. A bias may be generated when a rounding method is statistically more likely to round numbers in one direction than in the opposite i.e. all the numbers (or most of the numbers) are rounded for example 'Round up' or 'Round down'. Thus, the change in each number (decrease if rounded in the direction 'Towards Zero' or vice versa) will contribute to causing a significant effect in the calculation of the output, thereby generating a biased output. However, if the numbers are (statistically) equally rounded to both directions (say some numbers in the direction 'Towards Zero' and some numbers in the direction 'Away from Zero'), the effect of changes in the rounded numbers cancel out, thereby generating a relatively unbiased output.

For example, one of the simplest options for rounding a positive number is by the basic Rounding Down method or technique. While rounding down, the fractional part (or, more generally, the part following the rounding point, if that is not the same as the radix point) of the number to be rounded is discarded and the integer part of the number is returned as the rounded number. Though this is simple to work, this introduces bias as on average the values of a uniformly distributed set of numbers are reduced by a half. Similarly, an equivalently basic Rounding Up method (i.e. rounding any fractional part up to the closest integer) introduces bias as on average the values of a uniformly distributed set of numbers are increased by a half.

Some of the rounding methods such as round towards zero and round away from zero are both supposedly unbiased in expectation, but in reality, these methods introduce a bias of +0.5 in the positive space and −0.5 in the negative space (or vice versa) and this is not ideal. Among all the different rounding methods, round to even has been adopted as the default mode of rounding technique in industry standards as it is unbiased (assuming all the values are equally probable). But unfortunately, there is a considerable cost in hardware to achieve this.

Hence, existing methods or techniques of rounding numbers have drawbacks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method and hardware for performing hardware efficient unbiased rounding of a number is provided herein. The method includes receiving the number in a binary format having a first portion and a second portion. The first portion comprises bits of the number above a rounding point and the second portion comprises bits of the number after the rounding point. The method includes adding a first amount to the number to obtain a first value. Further the method comprises determining if the bit above the rounding point for a controlling value is '0' bit or a '1' bit. The controlling value is either the received number in the binary format or the first value. The method further includes adding a second amount to 'b+1' LSBs of the first value to obtain a second value if the bit above the rounding point for the controlling value is a '0' bit and rounding the number by truncating the last b bits of the second value or the last b bits of the first value based on the determination.

According to a first aspect there is provided a method of performing hardware efficient unbiased rounding of a number, the method comprising: receiving the number in a binary format with a bit length of m bits, having a first portion with bit length of 'a' bits and second portion with bit-length of 'b' bits, wherein the first portion comprises bits of the number above a rounding point and the second portion comprises bits of the number after the rounding point; adding a first amount to the number to obtain a first value; determining if the bit above the rounding point for a controlling value is '0' bit or a '1' bit, wherein the controlling value is either the received number in the binary format or the first value; if the bit above the rounding point for the controlling value is a '0' bit, adding a second amount to 'b+1' LSBs of the first value to obtain a second value and truncating the last b bits of the second value; or if the bit above the rounding point for the controlling value is a '1' bit, truncating the last b bits of the first value; and wherein the first amount and the second amount to be added are determined based on the number of 'b' bits of the second portion and wherein the first value and the second value are represented in the same binary format as the received number.

Optionally, the value of the second amount is the value of the LSB of the second portion.

Optionally, adding the second amount comprises adding '1' to the LSB of the first value.

Optionally, the first amount is the difference between the value of position of MSB of the second portion and the second amount, such that when b=1, the first amount is zero.

Optionally, adding the second amount is performed using a 'b+1' bit adder.

Optionally, the first value and the second value are having the same 'a–1' MSBs.

Optionally, adding a second amount to 'b+1' LSBs of the first value generates an intermediate value having a bit length of 'b+1' bits.

Optionally, the second value is obtained by combining 'a–1' MSBs of the first value and 'b+1' bits of the intermediate value.

According to a second aspect there is provided a method of performing hardware efficient unbiased rounding of a number, the method comprising: receiving the number in a binary format with a bit length of m bits, having a first portion with bit length of 'a' bits and second portion with bit-length of 'b' bits, wherein the first portion comprises bits of the number above a rounding point and the second portion comprises bits of the number after the rounding point; adding a first amount to the number to obtain a first value having a first portion with bit length of 'a' bits and second portion with bit-length of 'b' bits, wherein the first amount is determined based on the number of 'b' bits of the second portion; and checking if the bit above the rounding point for the first value is a '0' bit and if all the bits after the rounding point is '1' bit, if so, obtaining the rounded number by setting the LSB of the first portion of the first value to '1' and truncating the last b bits of the first value; or, if not, obtaining the rounded number by truncating the last b bits of the first value.

According to a third aspect there is provided a method of performing hardware efficient unbiased rounding of a number, the method comprising: receiving the number in a binary format with a bit length of m bits, having a first portion with bit length of 'a' bits and second portion with bit-length of 'b' bits, wherein the first portion comprises bits of the number above a rounding point and the second portion comprises bits of the number after the rounding point; adding a first amount to the number to obtain a first value having a first portion with bit length of 'a' bits and second portion with bit-length of 'b' bits, wherein the first amount is determined based on the number of 'b' bits of the second portion; checking whether the bit above the rounding point for number is a '0' bit and the bit below the rounding point for number is a '1' bit and if so, obtaining the rounded number by setting the LSB of the first portion of the first value to '1' bit and truncating the last b bits of the first value; or, if not, obtaining the rounded number by truncating the last b bits of the first value.

Optionally, the received number has an integer part and a fractional part.

Optionally, the first portion of 'a' bits comprises bits of the integer part and none, one or more MSBs of the fractional part to which the number needs to be rounded.

Optionally, adding the first amount is performed using a 'm' bit adder.

Optionally, adding the first amount is integrated with an in-built adder in a logic in the hardware producing the number to be rounded.

Optionally, the method of performing hardware efficient unbiased rounding the number is used for any hardware such as a GPU, neural network accelerators and the like which involves computation of numbers including rounding of numbers.

According to a fourth aspect there is provided an efficient hardware implementation for performing unbiased rounding, the hardware implementation comprising: a first adder unit configured to: receive a number in binary format with a bit length of m bits, having a first portion with bit length of 'a' bits and a second portion with bit-length of 'b' bits, the first portion comprises bits of the number before a rounding point and the second portion comprises bits of the number after the rounding point; and add a first amount to the number N to obtain a first value; a second adder unit configured to add a second amount to 'b+1' LSBs of the first value to obtain a second value, wherein the second amount is added if the bit above the rounding point for the first value is a '0' bit, wherein the first amount and the second amount to be added is determined based on the bit length 'b' bits of the second portion; and a shifter is configured to: shift the second value by 'b' bit to the LSB side if the bit above the rounding point for the first value is a '0' bit; or shift the first value by 'b' bit to the LSB side if the bit above the rounding point for the first value is a '1' bit.

Optionally, the first adder unit is an m-bit adder.

Optionally, the second adder unit is a 'b+1' bit adder.

Optionally, the shifter is implemented by hard wiring the wires from the second adder unit or the first adder unit.

Optionally, the first adder unit is integrated with an in-built adder in a logic in the hardware producing the number to be rounded, and optionally wherein the logic is a Finite Impulse response (FIR) filter used in image processing.

Optionally, the second adder unit adds the second amount by adding '1' to the LSB of the first value.

Optionally, the first adder unit adds the first amount which is the difference between the value of the MSB of the second portion and the second amount.

According to a fifth aspect there is provided a method of manufacturing, using an integrated circuit manufacturing system, a hardware implementation according to the fourth aspect.

According to a sixth aspect there is provided computer readable code configured to cause the method according to the first, second or third aspect to be performed when the code is run.

According to a seventh aspect there is provided a computer readable storage medium having encoded thereon the computer readable code according to the sixth aspect.

According to an eighth aspect there is provided an efficient hardware implementation for performing unbiased rounding, the hardware implementation comprising: a first adder unit configured to: receive a number in binary format with a bit length of m bits, having a first portion with bit length of 'a' bits and a second portion with bit-length of 'b' bits, the first portion comprises bits of the number before a rounding point and the second portion comprises bits of the number after the rounding point; and add a first amount to the number N to obtain a first value; hardware logic configured to: check if the bit above the rounding point for the first value is a '0' bit and if all the bits after the rounding point is '1' bit, if so, obtaining the rounded number by setting the LSB of the first portion of the first value to '1' and truncating the last b bits of the first value using a shifter; or, if not, obtaining the rounded number by truncating the last b bits of the first value using the shifter.

According to a ninth aspect there is provided an efficient hardware implementation for performing unbiased rounding, the hardware implementation comprising: a first adder unit configured to: receive a number in binary format with a bit length of m bits, having a first portion with bit length of 'a' bits and a second portion with bit-length of 'b' bits, the first portion comprises bits of the number before a rounding point and the second portion comprises bits of the number after the rounding point; and add a first amount to the number N to obtain a first value; a rounding unit configured to: check whether the bit above the rounding point for number is a '0' bit and the bit below the rounding point for number is a '1' bit and if so, obtaining the rounded number by setting the LSB of the first portion of the first value to '1' bit and truncating the last b bits of the first value using a shifter; or, if not, obtaining the rounded number by truncating the last b bits of the first value using the shifter.

The hardware implementation for performing an unbiased rounding of a number may be embodied in hardware on an integrated circuit. There may be provided a method of manufacturing, at an integrated circuit manufacturing system, a hardware implementation for performing an unbiased rounding of a number. There may be provided an integrated circuit definition dataset that, when processed in an integrated circuit manufacturing system, configures the system to manufacture a hardware implementation for performing an unbiased rounding of a number. There may be provided a non-transitory computer readable storage medium having stored thereon a computer readable description of a hardware implementation for performing an unbiased rounding of a number that, when processed in an integrated circuit manufacturing system, causes the integrated circuit manufacturing system to manufacture an integrated circuit embodying a hardware implementation for performing an unbiased rounding of a number.

There may be provided an integrated circuit manufacturing system comprising: a non-transitory computer readable storage medium having stored thereon a computer readable description of the hardware implementation for performing an unbiased rounding of a number; a layout processing system configured to process the computer readable description so as to generate a circuit layout description of an integrated circuit embodying the hardware implementation for performing an unbiased rounding of a number; and an integrated circuit generation system configured to manufacture the hardware implementation for performing an unbiased rounding of a number according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 5A is a flowchart illustrating a method of performing hardware efficient unbiased rounding of a number;

FIG. 5B is a flowchart illustrating a method of performing hardware efficient Round To Nearest Odd technique;

Figure 1:
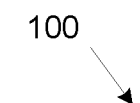
FIG. 1 shows a table of results of a biased rounding technique.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the FIGS., where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

A method of performing hardware efficient unbiased rounding of a number is disclosed herein. The method enables rounding of a number by eliminating the bias introduced on rounding the number, while increasing the hardware efficiency.

Typically, in electronic circuits such as binary logic circuits, while performing various calculations (or arithmetic operations), the output values are rounded or truncated in order to fit the output value into its finite representation. Rounding may also be done at various stages of calculation before generating a final output. Examples of these arithmetic operations include addition, subtraction, multiplication, division, and the like, using fixed point or floating point numbers.

To understand the effect of rounding (rounding error) in various arithmetic operations, consider a simple example of adding a set of floating point numbers using an accumulator. The accumulator adds each number to a previously calculated output (sum) to generate a new or cumulative output. In other words, the overall sum is performed as a sequence of individual sums of two numbers. The final output is thus generated after adding all the floating-point numbers in an array of inputs. The output from the adder in each step is rounded which causes a rounding error in the output generated in each cycle. The rounding error at each cycle thus accumulates until the final output is generated. Rounding errors are a characteristic of floating point calculations, and can arise, for example, when the exponent of the represented number changes, e.g. as an accumulated sum increases.

Similarly, consider a network of floating point adders for performing parallel summation such as a tree adder (for example a binary tree adder). In the case of binary tree adders, addition is performed by a plurality of adders in separate stages. Each adder is configured to receive two inputs and generate an output (sum) of the two inputs. The output of one such adder may form one of the inputs of another adder, such that after the final stage the sum of all the input numbers has been calculated.

The implementation of the accumulator or the tree adder perform rounding in each stage of addition, thereby causing intermediate rounding error, which causes a significant error in the overall output. As a result, the final output will likely be different to the result obtained by adding all the input numbers in one step and then rounding.

Multiple rounding may result in a rounding error which is often referred to as dramatic cancellation. A dramatic cancellation can occur when very small numbers are added to very large ones and may cause significant bits of the result to be lost due to rounding. E.g., when summing a large positive number, P, the corresponding negative number, –P, and two small positive numbers Q and R, the precise value of the sum is (Q+R). The effect is most often seen in floating point arithmetic, due to the large range of the numbers that can be represented. For example, using a binary tree adder, an arrangement of floating point additions summing P and –P in a first primary adder and Q and R in a second primary adder ought to give the final result (Q+R). However, if the inputs are ordered differently and the primary adders perform the sums (P+Q) and (–P+R), and P is much larger than Q and R, then the outputs of the primary adders could be rounded to P and –P, giving an overall output of 0. Thus, for different orders in which input is provided to a binary tree adder, different outputs are generated. Similar effects can be observed in an accumulator and other general types of tree adders. Thus, the cumulative effect of rounding in various arithmetic operations causes a significant error in the output of various electronic circuits.

In the examples herein, rounding methods are described using integer and fixed point numbers. It should be understood that integer and fixed point operations are often used alone, but may also be the building blocks from which floating point operations are constructed. In this way, the techniques described may be applicable to rounding of integers, fixed point, and floating point numbers.

As another example, consider an electronic circuit such as a Finite Impulse Response (FIR) filter which is an important component in digital signal processing (DSP) sub-systems and in image processing systems. FIR filters are open loop signal processors. These are numerical filters, and roundoff takes place within these filters when certain numerical operations are performed upon the filter input signals.

The output y(k) of the FIR filter is the convolution of the input with the impulse response of the filter, for the kth value of the input. The output is a weighted linear combination of present and past input values as shown below, where N input values x are convolved with corresponding weight values h.

$$y(k)=h(0)\times x(k)+h(1)x(k-1)+ \ldots +h(N-1)\times(k-N+1)$$

For each time instant the calculation of the output signal y(k) involves the formation of a sum of products. The FIR filter may comprise a plurality of coefficient multipliers for calculating the product values, which may be implemented by add/subtract/shift operations. These multipliers may be implemented using long tree adders. Further each product may be calculated by a different tree adder or accumulator. Thus, the effect of rounding in each stage of the output of the different adders might affect the overall output of the filter circuit which in turn would affect the output of the DSP or image processing system. For example, the error in the output of the filter due to rounding may affect the colour of the pixel in the final output. Thus, the cumulative effect of the error due to bias in rounding might make the pixels darker and darker.

Hence there is a need for a hardware efficient rounding technique to generate more precise output of the electronic circuits.

As mentioned above, the different rounding methods/techniques may be a biased or an unbiased technique. FIG. 1 is a table 100 showing results of an example of a biased rounding technique used for rounding a set of numbers. Table 100 in FIG. 1 shows four numbers (in rows numbered 1 to 4) that are rounded using a 'round to nearest, round ties up' technique, referred to below for the sake of brevity as a 'Round Ties Up' technique. In this rounding technique, fractional values are rounded to the nearest whole integer. Fractional values of a half, being 'tied' in closeness between the integers above and below the value, are treated as a special case, and are rounded up.

Table 100 shows a plurality of numbers both in their decimal format and binary format. The numbers in the binary format have a bit length of 'm' bits. In this example each number (having a bit length of m=6 bits) comprises an integer part having a bit length of '4' bits and fractional part having a bit length of '2' bits. Table 100 comprises numbers between 7 and 8 as an example.

An algorithm for implementing the Round Ties Up technique, as shown in table 100, comprises two steps. At first, 'a half' (or 0.10 in binary) is added to each binary number N (shown in the 'N+ half' column in the table). Adding a half can be performed by using an m bit adder.

Further, at a second step, the fractional part is truncated (or discarded) thereby rounding the number to the integer value. By doing these steps, as shown in table 100 (which shows the truncated values in binary and corresponding integer, in the last two columns), the numbers less than 7.5, i.e. the numbers 7 and 7.25 are rounded down to the nearest integer 7 (rounded to the lower number) and the numbers greater than 7.5, i.e. 7.75, are rounded up to the nearest integer 8 (rounded to the higher number). However, numbers exactly half-way between two integers (ties), like the number 7.5, are always rounded up to the nearest integer (i.e. to a higher number) and this introduces a bias in the output generated. The effect of this bias can be seen, for example, in the average (mean) value of the rounded integer values, which is larger than the average value of the input decimal values.

This 'Round Ties Up' technique can use a minimum number of adders (just one adder) and hence can be a hardware efficient technique. Also, this technique is much less biased than the basic 'Round Down' technique discussed above (where the fraction part is totally discarded) or a corresponding basic Round Up method (where any number is directly rounded up to a next integer). However, it is still biased, and this bias may become more apparent when using fixed point numbers with only a few fractional bits. This Round Ties Up technique (i.e. 'round to nearest, round ties up') is biased because all the numbers exactly half-way between two integers get rounded up.

Figure 2:
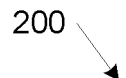
FIG. 2 shows a table of results of an unbiased rounding technique.

FIG. 2 is a table 200 showing results of an example of an unbiased rounding technique used for rounding a set of binary numbers. Table 200 in FIG. 2 shows eight numbers (rows numbered 1 to 8) which are rounded using a 'round to nearest, round ties to even' technique, referred to below for the sake of brevity as a 'Round to Nearest Even (RNE)' technique.

Table 200 also shows 8 numbers both in their decimal format and binary format. Consider that the numbers in the binary format each having a bit length of m bits. The numbers comprise an integer part having a bit length of '4' bits and a fractional part having a bit length of '2' bits, thus m=6 bits. Table 200 includes numbers between 7 and 9 as an example.

An algorithm for implementing the RNE technique, as shown in table 200, comprises three steps. At first, a 'quarter' (or 0.01 in binary) is added to each number N (shown as N+ quarter in the fourth column of the table, also referred to as 'Q') As shown in table 200 in binary, numbers 7, 7.25, 7.5, 7.75, 8, 8.25, 8.5 and 8.75 (in rows numbered 1 to 8) become 7.25, 7.5, 7.75, 8, 8.25. 8.5, 8.75 and 9 respectively after the first step.

Further, at a second step (as shown in the fifth column of the table), another 'quarter' is added to the numbers Q whose integer part (after the first step) represents an odd number. As shown in table 200, the numbers in the rows numbered 1, 2, 3, and 8 (after the first step) each now have an odd integer part (i.e. the binary digit to the left of the binary point is a '1') which is 7 or 9. Hence, at the second step, a quarter is added to these numbers Q. The numbers Q in the rows numbered 4, 5, 6, and 7 have integer part as even numbers. Further, for future reference, on considering the numbers N in the rows numbered 2 and 3, it is noted that only the LSB of the number Q in row 2 is changed on adding a second quarter whereas all the bits of the numbers Q in the row 3 change during addition of the second quarter. Hence for implementing the RNE technique in this way there is a requirement of two 'm' bit adders (i.e. both the first and second steps require full 'm' bit length adders").

In a third step, the fractional part of each numbers in the rows numbered 1 to 8 obtained after the second step is truncated (or discarded) thereby rounding the number to an integer. This truncation is cheap in hardware as it can be realized by hard wiring.

By doing these steps, as shown in table 200, numbers 7 and 7.25 (which are less than 7.5), are rounded to the nearest integer 7 (i.e. rounded to a lower number). The numbers in the rows numbered 3-7 (which are between 7.5 and 8.5), are rounded to the integer 8. The number 8.75 (value greater than 8.5) is rounded up to the nearest integer 9. In this technique, the numbers in the rows numbered 3 and 7 (which are exactly half-way between two integers, being 7.5 and 8.5) are rounded to the nearest even number in this case 8. This eliminates bias in the output generated (assuming all numbers are equally probable). The effect of eliminated bias can be seen, for example, in the average (mean) value of the rounded integer values, which is same as the average value of the input decimal values. However, compared to the Round Ties Up technique discussed with respect to FIG. 1 the hardware cost increases as the RNE technique requires two m bit adders. In some cases, the first m bit adder may be realized by an adder in the hardware which produces the number to be rounded. But still, there is a need of another full m bit adder to implement this technique.

The inventors have devised a more efficient hardware efficient method of performing an unbiased rounding of a number which is explained in detail below.

Figure 3:
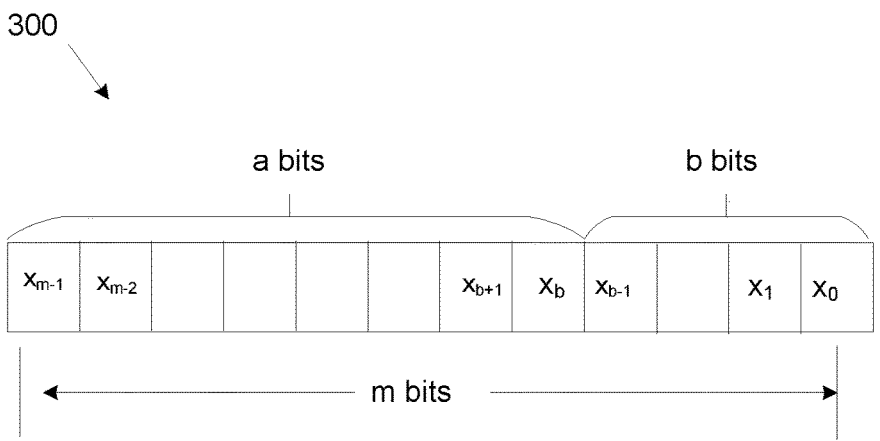
FIG. 3 shows a number in a binary format.

To better understand the various rounding methods (or techniques) described with respect to the FIGS. given below, consider a number in a binary number format (such as a fixed point number) having a bit length of 'm' bits. FIG. 3 shows a number in a binary format. The number comprises a first portion representing the most significant bits of the number and having a bit length of 'a' bits and a second portion representing the least significant bits of the number and having a bit length of 'b' bits. The 'a' bits represent the number of bits to which the binary number is rounded to. The 'a' bits may represent the integer part of the number and the 'b' bits may represent the fractional part of the number, however this is not always the case. A number may be rounded at any position, not necessarily corresponding to the position of the binary point.

Figure 4:
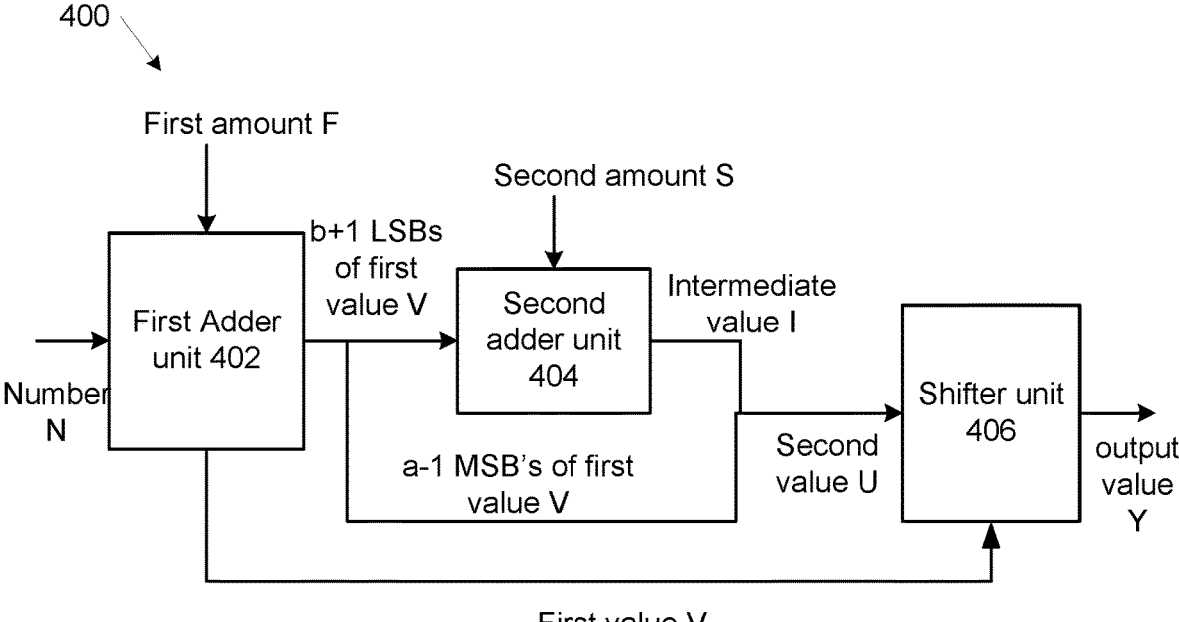
FIG. 4 is a block diagram of a hardware implementation for performing an unbiased rounding of a number.
Figure 6:
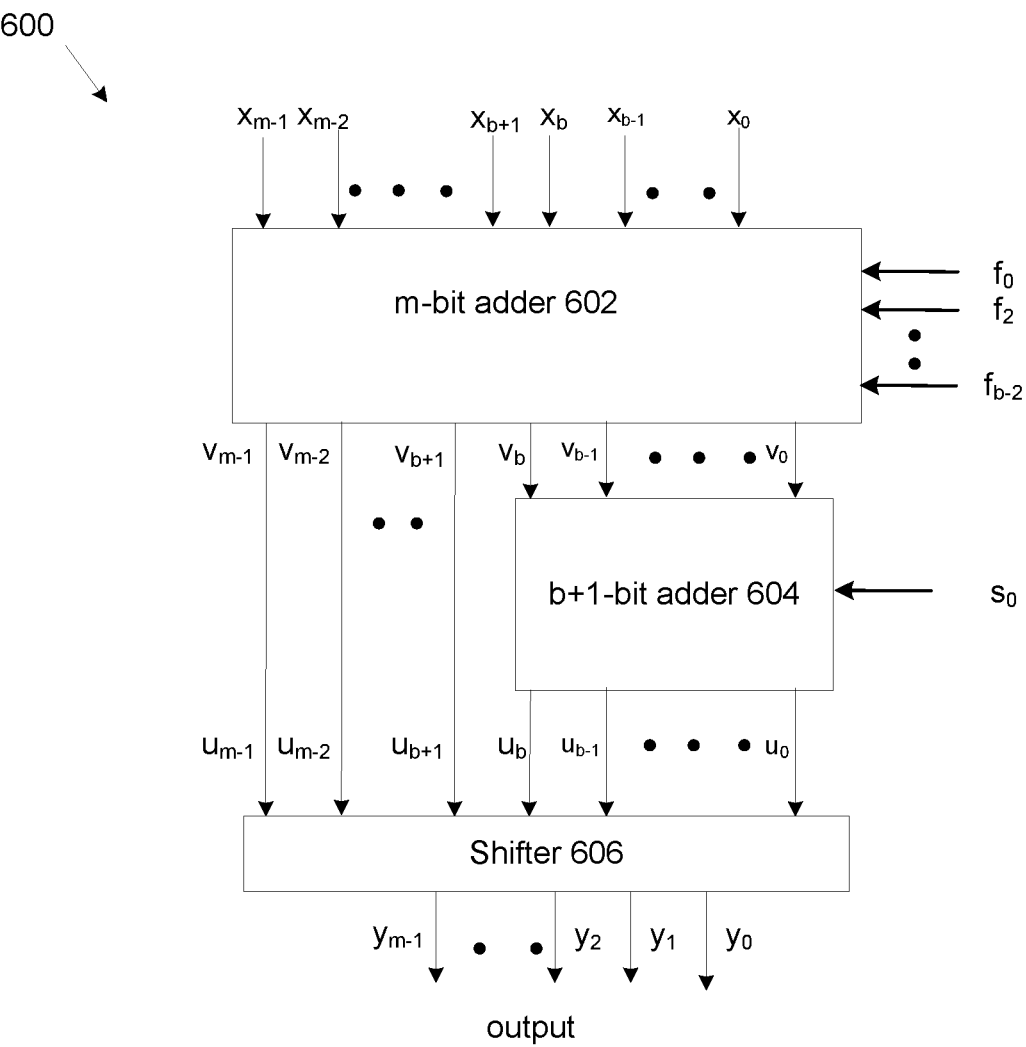
FIG. 6 is another block diagram 600 illustrating the different units in the hardware implementation 400 given in FIG. 4.

FIG. 4 is a block diagram of a hardware implementation for performing an unbiased rounding of a number. The hardware implementation 400 comprises a first adder unit 402, a second adder unit 404, and a shifter unit 406. The hardware implementation 400 can be used for rounding any number. For example, consider the number is a number N in binary format as shown in FIG. 3. The number N in the binary format has a bit length of 'm' bits and comprises a first portion having a bit length of 'a' bits and a second portion having a bit length of 'b' bits. FIG. 6 is another block diagram 600 illustrating the different units in the hardware implementation 400 given in FIG. 4.

The first adder unit 402 could be an existing calculation circuitry in any electronic circuits. The examples of calculation circuitry could be an inbuilt adder (i.e. an adder that would be required anyway, prior to any rounding step) or a multiplier circuit (see examples below) in an electronic circuit. For example, the first adder unit 402 could the final adder in the adder tree of an FIR filter as explained earlier. The first adder unit 402 is at least an 'm' bit adder 602 as shown in FIG. 6. The second adder unit 404 is an adder implemented based on the number of 'b' bits of the number N. The second adder unit 404 is a 'b+1' bit adder 604 as shown in FIG. 6 (it will be understood that the second adder could have a wider bit-width, but that would needlessly increase the hardware area used). The shifter unit 406 is implemented to shift the number to the LSB side (i.e. to the right side), to thereby perform truncation. The shifter unit 406 is implemented based on the number of 'b' bits in the second portion of the number. The example of a shifter unit is a 'b' bit shifter 606 as shown in FIG. 6.

The working of the hardware implementation 400 and 600 is explained with reference to the flowchart in FIG. 5A. FIG. 5A is a flowchart illustrating a method of performing hardware efficient unbiased rounding of a number.

The method includes at step 502 receiving the number N in a binary format having a bit length of 'm' bits. The number N is received by the first adder unit 402 in the electronic circuit (e.g. the final adder in an FIR filter, the output of which is to be rounded). The first adder unit 402 is an 'm' bit adder 602 as shown on FIG. 6.

The number N comprises a first portion having a bit length of 'a' bits and a second portion having a bit length of 'b' bits as shown in FIG. 3. The number N is divided into two portions by an arbitrary rounding point. The first portion represents the portion of the number N above the rounding point which means the number N is rounded to a number represented by 'a' bits of the first portion. The second portion represents the portion of the number N after the rounding point which means the portion to be truncated while rounding the number. In an example, the first portion represents an integer part having a bit length of 'a' bits and the second portion represents a fractional part having a bit length of 'b' bits. However, in other examples the first portion can be any number of bits of the number N comprising only some of the integer bits or all integer bits and only some of the fractional bits. Thus, by using this method it is possible to round a binary number to any length. The bits of the number N from the LSB to MSB are represented as $x_0, x_1, \ldots x_{b-1}, x_b, x_{b+1}, \ldots x_{m-1}$, where m=a+b.

At step 504, a first amount F is added to the number N to obtain a first value V in the binary format. The addition is performed by the first adder unit 402. The first adder unit receives the number N as a first input and the first amount F as a second input. The value of the first amount F depends on the value of a second amount S.

The second amount S is the value of the LSB of the number N, i.e. the second amount is the value of the last bit of the second portion of the number N. Put another way, the second amount has the value of a 1 bit in the LSB position. For example, for a number N comprising a second portion having a number of bits b=2, the value of the second amount is 01. Similarly, for a number N comprising a second portion having a number of bits b=3, the value of the second amount is 001.

The value of the first amount is the difference between the value of MSB of the second portion and the second amount. That is, the value of the first amount is the difference between a 1 bit in the MSB position and the second amount. Thus (ignoring the radix point for the moment, and treating the numbers as a simple binary string), when b=2, the second amount is 01 and the first amount is 01 (i.e. 10−01=01). Similarly, when b=3, then the second amount is 001 and the first amount is 011 (i.e. 100−001=011).

For example, for a binary number N having 2 fractional bits and being rounded to an integer, the fractional bits correspond to the second portion—i.e. b=2—and the value of the second amount is 0.01. The value of the first amount is the difference between the value of the MSB of the second portion and the second amount. Thus, in this example, the first amount is 0.10-0.01 which is 0.01.

Similarly, for a binary number N having 5 fractional bits and being rounded to a number having 2 fractional bits, then the three least significant fractional bits correspond to the second portion—i.e. b=3—and the value of the second amount is 0.00001. The value of the first amount is the difference between the value of the MSB of the second portion and the second amount. Thus, in this example, the first amount is 0.00100-0.00001 which is 0.00011. Note that the position of the leading 1 in the first amount is such that the value may always be represented by 'b−1' bits. Similarly, the second amount may be represented by a single bit.

The first adder unit 402 receives the number N as a first input and the first amount F as a second input. The first adder unit 402 (or 'm' bit adder 602) adds the number N having a bit length of m bits to a first amount F to obtain the first value V having a bit length of m bits. Note that the first adder unit has a width of 'm' bits, since it is possible that the addition of the first amount F may affect the upper bits of the first value V through the propagation of carries. However, it is assumed in the examples herein that the range of values of the input numbers N is such that the addition of the first amount will not cause overflow of the 'm' bit values. If that is not the case then the circuits can be modified accordingly, for example by increasing the size of values V and U, and the width of the first adder unit 402, to m+1 bits, as is known in the art.

As shown in FIG. 6, the number N is represented in binary format by bits $(x_0\text{-}x_{m-1})$. The number N has a first portion having 'a' bits $(x_b\text{-}x_{m-1})$ and a second portion having 'b' bits $(x_0\text{-}x_{b-1})$, where m=a+b. The first amount F is most efficiently represented in a binary format using 'b−1' bits $(f_0\text{-}f_{b-2})$. The 'm' bits $(x_0\text{-}x_{m-1})$ of number N is added with the bits $(f_0\text{-}f_{b-2})$ of the first amount F as shown in FIG. 6 to obtain the first value V represented in binary format using bits $(v_0\text{-}v_{m-1})$. The first adder unit can be implemented by using any type of adder capable of adding these numbers.

The first adder unit, as discussed above, may be an inbuilt adder in an electronic circuit (i.e. an adder already present to perform the calculations of the electronic circuit, before the step of rounding). The implementation of the first adder with the existing hardware is explained in detail with reference to the examples provided in FIGS. 7-9.

The first amount may also be represented in some examples using 'm' bits or a bit length greater than 'b−1' bits, by padding the bits above the bit 'b−2' as zero. The m bit adder can be a fully featured m-bit adder adding two m bit number: In such case each cell of the adder is the same full-adder cell, having two inputs and a carry in, and one sum output and a carry out. However, when the first amount F is represented using lesser number of bits say b−2 bits, the m bit adder can be implemented with the corresponding upper part of the m bit adder having simpler half adder cells (which take only two inputs, one of which could be used as the carry in).

At step 506, it is determined if the bit above the rounding point for a controlling value is '0' bit or a '1' bit. The controlling value is either the received number in a binary format or the first value. In the following example the controlling value is initially considered to be the first value, but it is explained later why it is equivalent to use the number in binary format. If the controlling value is the received number in binary format, the determination at step 506 could be performed before performing the step 504. If the determination is 'No', i.e. if the bit before the rounding point for the controlling value (in this example first value) is a '1' bit, the corresponding first value of the number N is provided as the input to the shifter unit 406 (or 606). This is shown as providing the first value V from the first adder unit 402 to the shifter unit 406 in FIG. 4 (not shown in FIG. 6 to reduce the complexity). Further, the method proceeds to step 509.

If the determination at step 506 is 'Yes', i.e. if the bit above the rounding point for the first value as the controlling value (i.e. bit $v_b$) is a '0' bit, the method proceeds to step 508 to add a second amount S to the first value V, by adding the second amount S to the 'b+1' LSBs of the first value V. The second amount S as described above is the value of the LSB of the number N. As mentioned above for a number N having a number of bits b=2, the value of second amount is 01. As mentioned above, for a number N having two fractional bits and being rounded to an integer, b=2 and the value of second amount is 0.01.

The step of adding a second amount is therefore equivalent to adding a '1' bit to the LSB of the first value. The addition of the second amount is performed by second adder unit 404. The second adder 404 is a 'b+1' bit adder. The second adder unit 404 receives the last 'b+1' bits of the first value, V as a first input and the second amount S represented as a single bit binary number as a second input. The second adder unit 404 (which is a b+1 bit adder 604) adds the 'b+1' LSB's of the first value with the second amount S to generate an intermediate value I having a bit length of 'b+1' bits.

Further, the 'a−1' MSB's of the first value V is combined with the intermediate value I to generate a second value U. The first value and the second value also each have a bit length of m bits with a first portion having a bit-length of 'a' bits and a second portion having a bit length of 'b' bits.

The second value U is thus most efficiently obtained by implementing a 'b+1' adder compared to an 'm' bit adder used in other rounding techniques. This is because the outcome of step 506 is that second value U is only calculated for numbers where the bit above the rounding point, i.e. the $b^{th}$ bit of the number (or the least significant bit of the first portion) is a '0' bit. Therefore, the addition of the second amount F is realized using a b+1 bit adder as during addition any carry or overflowing bit from the b−1th position of the number (or MSB of the second portion) can be accommodated by the '0' bit in the $b^{th}$ position of the number N i.e. last bit of the first portion. In other words, there cannot be a situation where the addition of the second amount S to a number having a bit before the rounding point as '0' bit causes a change in any of the 'a−1' MSB's of the first value V.

The addition of the second amount S is explained with reference to FIG. 6. As shown in FIG. 6, the 'a−1' MSBs of the first value V are same as the 'a−1' MSBs) of the second value U. The b+1 LSB's of the first value V are represented in binary format using bits $(v_0-v_b)$ as represented in FIG. 6. The second amount S is most efficiently represented in binary format using a single bit $(s_0)$. The b+1 LSB's of the first value V and the second amount S are added to obtain the b+1 LSB's of the second value U which is represented by the bits $(u_0-u_b)$. This is referred to as the intermediate value I. Now the 'a−1' MSB's of the first value V and the 'b+1' bits of the intermediate value I are combined together to represent the second value U $(u_0-u_{m-1})$ having a bit length of m bits.

Thus, in the hardware implementation 400 and 600, the second addition is obtained by using a b+1 bit adder which could be much smaller in size than a 'm' bit adder. In an example, for a number having 8 (i.e. m=8) bits with 5 bits representing the first portion (or 'a' bits) and 3 bits representing the second portion (or 'b' bits), the second addition requires a 4 bit adder rather than 8 bit adder. In another example for a number having 32 bits (i.e. m=32) with 24 bits representing the first portion (or 'a' bits) and 8 bits representing the second portion (or 'b' bits), the second addition requires a 9 bit adder rather than a 32 bit adder. Thus, using this technique the hardware cost is considerably reduced compared to the existing RNE technique.

The adders 402/602 and 404/604 are described as 'm' bit and 'b+1' bit adders respectively, as this describes the width of at least one of their inputs. It is clear that the first and second amounts may be represented using fewer significant bits than the width of the adders to which they are inputs. Furthermore, several bits in the output of adder 404/604 are always discarded by shifter 406/606. The adders may be optimised accordingly.

After performing the step 508, the second value U is provided as an input to the shifter unit 406 and the method proceeds to step 510.

Thus the shifter unit 406 either receives the first value V as the input if the bit before the rounding point for the first value (generated at step 504) is a '1' bit or receives the second value U as the input if the bit before the rounding point for the first value (generated at step 504) is a '0' bit.

If the shifter unit 406 receives the first value V, as the input, after the determination at step 506, then at step 509, the method includes truncating the second portion of the first value (i.e. the 'b' LSB bits of the first value) provided to the shifter unit 406 to obtain an unbiased rounded number Y. The shifter unit can be implemented by hard wiring the output from the first adder unit 402. The shifter unit 406 or 606 shifts the first value V provided as input to the right side (i.e. to the LSB side) by b bits to discard the b bits of the second portion to obtain an unbiased rounded number.

If the shifter unit 406 receives the second value U as the input based on the determination at step 506, then at step 510, the method includes truncating the second portion of the second value) (i.e. the 'b' LSB bits of the second value) provided to the shifter unit 406 to obtain an unbiased rounded number Y. The shifter unit can be implemented by hard wiring the output from the second adder unit 404. In another example, the shifter unit can be implemented by hard wiring the outputs of the first adder unit 402 and the second adder unit 404, which together comprise the second value U. The shifter unit 406 or 606 shifts the second value U provided as input to the right side (i.e. to the LSB side) by b bits to discard the b bits of the second portion to obtain an unbiased rounded number. This rounding technique is unbiased as a tied number is rounded in either direction based on whether the bit before the rounding point for the first value is a '0' bit or a '1' bit. This eliminates the bias by rounding the number to either direction.

Also, this method is hardware efficient because, in the hardware implementation 400 and 600, the second addition is obtained by using a 'b+1' bit adder which could be much smaller in size than a 'm' bit adder. Thus, using this technique, the hardware cost is considerably reduced compared to the existing RNE techniques, such as discussed with respect to FIG. 2.

Although the technique described above has been considered for rounding at any level of precision, if the rounding point is taken to be the radix point then the technique amounts to a particularly efficient way of implementing a 'round to nearest, ties to odd' technique (referred to below, for the sake of brevity, as a 'Round to Nearest Odd' or RNO technique). This is illustrated by example below.

FIG. 5B is another flowchart illustrating a specific embodiment of the unbiased rounding of a number as a 'Round to Nearest Odd' (RNO) technique.

The method includes at step 552 receiving the number N in a binary format having a bit length of 'm' bits. The number N comprises a first portion having a bit length of 'a' bits and a second portion having a bit length of 'b' bits as shown in FIG. 3. In the specific embodiment, the first portion represents an integer part having a bit length of 'a' bits and the second portion represents a fractional part having a bit length of 'b' bits. Here the rounding point is same as the radix point of the number N. The bits of the number N are represented as $x_0$, $x_1$, . . . , $x_{b-1}$, $x_b$, $x_{b+1}$, . . . $x_{m-1}$, where m=a+b.

At step 554, a first amount F is added to the number N to obtain a first value V. The addition is performed by the first adder unit 402. The first adder unit receives the number N as a first input and the first amount F as a second input. As explained above, the value of the first amount F depends on the value of a second amount S.

The value of the first amount is the difference between the value of the MSB position of the second portion and the second amount. The value of the MSB position of the fractional part of the number is always a half or 0.1 in binary. Thus, when b=2, the second amount is 0.01 and the first amount is 0.01 (i.e. 0.10-0.01). Similarly, when b=3, then the second amount is 0.001 and the first amount is 0.011 (i.e. 0.100-0.001). Thus, in another example, when b=1, the second amount is 0.1 and the first amount is zero.

The first adder unit 402 (or m-bit adder 602) adds the number N having a bit length of m bits with a first amount F to obtain the first value V having a bit length of m bits. The first value also has a bit length of m bits with an integer part having a bit-length of 'a' bits and a fractional part having a bit length of 'b' bits.

At step 556, it is determined if the if the bit above the rounding point for the first value, as a controlling value, is a '0' bit i.e. in this embodiment whether the integer part of the first value is an even number. If the determination is 'No' i.e. if the bit above the rounding point for the first value is a '1' bit such that the integer part of the first value is an odd number, then the first value is provided as the input to the shifter unit and the method proceeds to step 559.

If the determination is 'Yes', the method proceeds to step 558 to add a second amount S to 'b+1' LSBs of the first value V. The second amount S as described above is the value of the last fractional bit of the number N. As mentioned above for a number N having a number of fractional bits b=2, the value of second amount is 0.01.

The step of adding a second amount is therefore equivalent to adding a '1' bit to the LSB of the first value. The addition of the second amount is performed by second adder unit 404. The second adder unit 404 receives the last 'b+1' bits of the first value, V as a first input and the second amount S, which may be represented by a single bit, as a second input to generate an intermediate value I having a bit length of 'b+1' bits. Further, the 'a−1' MSB's of the first value V is combined with the intermediate value I to generate a second value U. The second value also has a bit length of m bits with an integer part having a bit-length of 'a' bits and a fractional part having a bit length of 'b' bits.

After performing the step 558, the generated second value U is provided to the shifter unit and the method proceeds to step 560.

Thus, at step 554 the method adds the first amount, which is a quantity slightly less than half (less by the smallest amount possible in the binary representation) to the number. Further in step 558, the method adds the second amount to certain numbers based on the determination in step 556. The second amount is that smallest amount, which, added to the first amount gives exactly half. Here, the first amount is sufficiently close to a half to produce correct rounding, on its own, in most (i.e. any non-tied) situations. Being less than half, it will result in a tied value always being rounded down. Adding the second amount subsequent to a first amount results in adding a full half, with the result that tied values will round up instead. By controlling when the second amount is added, e.g. depending on whether the integer part of the value is odd or even, bias may be eliminated by ensuring that half of all tied values round up, and half of all tied values round down.

Thus, the rounded number is obtained by either performing the step 559 or 560.

If the shifter unit receives the first value V as the input, then at step 559, the method includes truncating the fractional part of the first value obtained after step 504 to obtain an unbiased rounded number Y. The first value V is provided to a shifter unit 406 based on the decision in step 556.

If the shifter unit receives the second value U as the input, then at step 560, the method includes truncating the fractional part of the second value obtained after step 558 or the fractional part of the first values (for which the integer part of the first value is an odd number) to obtain an unbiased rounded number Y. The second value U is provided to a shifter unit 406 based on the decision in step 556. This rounding technique is unbiased because the values which are exactly half-way between two integers, (for example number 8.5 and 9.5) are always rounded to the nearest odd number, which 50% of the time means the number is rounded up (e.g. 8.5) and 50% of the time means the number is rounded down (e.g. 9.5), thus eliminating the bias in the output generated.

Examples of performing unbiased rounding of a plurality of numbers using the hardware efficient unbiased rounding method (or the RNO technique) in FIG. 5B are explained with reference to the tables given in FIG. 7, FIG. 8 and FIG. 9.

Figure 7:
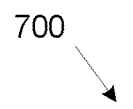
FIG. 7 shows a set of results obtained by performing the unbiased round to odd technique.

FIG. 7 shows a set of results obtained by performing rounding using the hardware efficient unbiased RNO technique. FIG. 7 is a table 700 showing results of the unbiased RNO rounding technique used for rounding a set of numbers. Table 700 in FIG. 7 shows 8 numbers (in rows numbered 1 to 8) which are rounded using the 'Round to Nearest Odd (RNO)' technique explained in FIGS. 4-6.

Table 700 also shows 8 numbers N in both decimal format and binary format (columns two and three, respectively, of Table 700). The numbers are shown in a binary format having a bit length of 'm=6' bits, comprising an integer part and a fractional part. As the rounding point in this example is the radix point, the integer part corresponds to the above-described first portion having a bit length of 'a' bits and the fractional part corresponds to the second portion having a bit length of 'b' bits. Therefore, in the example given in table 700, a=4 and b=2. Table 700 includes numbers between 7 and 9 as an example. However, it is known to a person skilled in the art that these techniques can be used to round much larger numbers and much smaller numbers.

The RNO technique, as described using FIG. 5B, comprises five steps.

At step 552, each number for rounding is received (numbers N are second and third columns of Table 700).

At step 554 a quarter or 0.01 (first amount F) is added to each number N to obtain a respective first value V. The first amount F is identified based on a second amount S. The second amount as mentioned above is the value of the LSB. In this example, as b=2, the second amount, shown as a value having a bit length of b+1 bits, is S=0.01 in binary, i.e. S=¼. Hence the first amount F is calculated as F=0.10-0.01. Therefore, the value of first amount F, shown as a value having a bit length of m bits, would be represented in binary as F=0000.01. As discussed above, this might be most efficiently represented as a single 1 bit.

The step 554 is shown in table 700 in the fourth column. The first amount (F) is added to the number N to obtain a first value V. This is performed, as explained above, using an 'm' bit adder.

Adding the first amount (0.01 in this example) includes adding a '1' bit to the LSB of the binary number. As shown in table 700, the numbers 7, 7.25, 7.5 7.75, 8, 8.25, 8.5 and 8.75 become 7.25, 7.5, 7.75, 8, 8.25. 8.5, 8.75 and 9 respectively after the step 554.

Further, at step 556, it is determined if the integer part of the first value V, as the controlling value, is an even number. If the determination is 'No', the second amount is not added to the first value, but the first value is provided as an input to the shifter at step 560. As shown in column four of table 700, the first value V corresponding to the numbers in the rows numbered 1, 2, 3 and 8 (after step 504) each have an odd integer part which is 7 or 9. Hence, the second amount is not added to these values and it remains unchanged. The first values corresponding to these numbers are same as the second value (as shown in columns 4 and 5 in the table 700).

At step 556, if the determination is 'Yes', the method proceeds to step 558 where the second amount S is added to b+1 LSB's of the first value V. The first values V in the rows numbered 4, 5, 6 and 7 (after step 504) each have an even integer part which is 8 as shown in table 700. Hence the second amount is added to 'b+1' LSB's of these first values V in step 558 to generate the second value U, as shown in column five of Table 700.

Again, adding the second amount (0.01 in this example) at step 558 includes adding a '1' bit to the LSB of the first value V. This is performed by a 'b+1' bit adder.

As it is evident from the table 700, during the addition of the second fraction to the first values V in the rows numbered 4-7, only (up to) the least significant 'b+1' bits (3 bits) are affected or changed—in this example, those are bits 0, 1 and 2. This is because bit 2 of the number N (or the last bit or the 1's position of the integer part) for an even number is always a '0' bit. Therefore, the addition of the second amount S realized using a 3 bit adder may create a carry or overflowing bit during addition of bit 1 of the number N (i.e. the MSB bit of the fractional part), but this can always be accommodated by the '0' bit in bit 2 of the number N without any further carry or overflowing bit to the next position (i.e. bit 3).

However, in the case of RNE technique explained before it is evident from the example given in FIG. 2 that all bits of the first value may be affected while performing the addition in line 2 of that method. Thus, a 6 bit adder is required to perform this step in a RNE technique. The RNO technique disclosed herein requires only a 3 bit adder in the example of FIG. 7.

Thus, for those numbers in the rows numbered 1-3 and 8 to which a second amount is not added, the first value (shown same as the second value U in column 5) is provided as input to the shifter. Then at step 559, the fractional bits of the first values are truncated to obtain the integer to which the number is rounded.

Further for those numbers in the rows numbered 4 to 7 to which a second amount is added, the second value U (as shown in column 5) is provided as input to the shifter. Thus, at step 560, the fractional part of the second value U (for those numbers in the rows numbered 4 to 7) obtained after the step 558 is truncated (or discarded) thereby rounding the number to an integer.

By doing these steps, as shown in table 700, the numbers N in the rows numbered 1-3 (which are less than or equal to 7.5), are rounded to the integer 7 (i.e. rounded to a lower number). The numbers N in the rows numbered 4-6 (which are between 7.5 and 8.5), are rounded to their nearest integer 8 (i.e. the number 7.75 is rounded up to 8 and the number 8.25 is rounded down to 8, thereby eliminating the bias in rounding). The numbers N in the rows numbered 7-8 (values greater than or equal to 8.5) are rounded up to the nearest integer 9.

In this technique, the numbers N in the rows numbered 3 and 7 (which are exactly half-way between two integers), like number 7.5 and 8.5, are always rounded to the nearest odd number. In this example the numbers are rounded to 7 and 9 respectively and this eliminates bias in the output generated.

An example of how the first addition (performed at step 554) of the hardware efficient rounding technique could be incorporated efficiently into a hardware design can be explained using an implementation of an FIR filter in an existing hardware design.

FIR filters as described above can be described as a digital filter performing a discrete convolution. That is, the calculation can be summarised as providing a weighted sum of a series of sample values, by multiplying the values by a set of coefficients. The number of coefficients (and, thus, the number of multiplications between a coefficient and a data value) is also referred to as the number of 'taps' for the filter. Each term of the weighted sum can be considered as a number N from the preceding discussion.

Suppose we are implementing a three tap FIR filter with coefficients ¼(1 2 1). In this case (using a simplified notation compared to above) the output, y, of the FIR filter at a given timestep is given by the following calculation, where $x0$ is the sample value at the particular timestep in question, $x1$ is the sample value for the previous timestep, and $x2$ is the sample value for the timestep before that:

$$y=(x0+2*x1+x2)/4$$

The need to apply rounding may also occur when a division operation creates a value with a fractional part which is then truncated. A division by a power of two (e.g. 4) is a common operation in many binary arithmetic systems, such as shown in the above equation for the output of an FIR filter, and may be implemented using a shift. For example, a divide by four is implemented as shift right of two bits, which is equivalent to moving the radix point two bits towards the MSB. To create a result with the same number of fractional bits as the input (e.g. an integer), two least significant fractional bits may be truncated, using rounding. It can therefore be seen that a rounded division by a power of two is effectively equivalent to the rounding techniques described above, with the only difference being in the interpretation of the position of the radix point in the resulting numbers.

Thus, the rounded division by four may be considered to be equivalent to rounding off two bits from the sum of terms. In accordance with the example described above with respect to FIG. 7, we know that the first amount F of the efficient rounding technique will be one quarter in these circumstances. That first amount F will need to be added to every output of the summation in the FIR calculation, during the rounding operation, and so the hardware for performing the FIR calculation can be designed accordingly, making it possible to add the first amount F 'cheaply' by exploiting the multiplication at the second tap of the filter.

For example, among the coefficients 1 2 1, the multiplication by 2 involves a shift to the left by one bit position. In a pure multiplication by 2, that shift would create a 'new' LSB, which would be set as '0'. However, the FIR calculation can be adapted such that, instead of setting the new LSB to '0', the LSB is set to a '1' bit. This is a small/cheap change to the 'pure' multiplication circuitry, but adds a one within the parenthesis of the calculation, which in combination with the division by four outside the parentheses, amounts to adding one quarter to the result of the calculation. In other words, this makes it possible, in terms of the rounding technique discussed above, to realize the addition of a quarter as the first amount (i.e. addition of al' bit to the LSB of the number N) to obtain a first value, without introducing what would otherwise have been another full-width adder to add the first amount to the output of the FIR calculation to perform the first step of the rounding technique.

In the above example the output can be realized using a code $$y=\text{Round}(x0+(x1<<1)+x2);$$

In hardware the shift operation and setting a bit to '1' can be realized by hard wiring. Thus, the cost of the operation $(x1<<1+1)$ is also effectively free in a hardware sense, thereby reducing the cost of adding a first fraction. The additional 1 introduced by the operation $(x1<<1+1)$ to the LSB may have area/cost implications for the design of the adder summing this term with $x0$ and $x2$, but these implications are very small compared to trying to implement the rounding in a less integrated way.

The implementation of the first addition using the three tap FIR filter is an example of how existing circuitry producing values that will need rounding can be exploited to cheaply integrate the first adder of the rounding technique. It is evident for a person skilled in the art that the addition could be implemented by exploiting any suitable electronic circuits producing a value that needs rounding.

The following code example uses the described technique to implement a rounded division by four

```
// Input: integer value x to be divided by 4 and rounded to an integer
int Divide4AndRoundToNearestOdd( int x )
{
L1: x++;                    // always add a quarter
L2: if ((x & 0x04) == 0) x++;    // add another quarter 50% of the time
L3: return x >> 2;          // truncate the 2 LSBs
}
```

The rounded division by four and a rounding to remove two fractional bits are essentially equivalent. It is therefore informative to consider the example code above operating on the values shown in FIG. 7. It can be observed that the addition of the second amount in Line 2 only alters the rounded output when both the fractional bits are set to one. In FIG. 7, following the addition of the first amount, values 4-7 have corresponding first values V which have an even integer part (i.e. the least significant integer bit is zero) numbers (column 4 of Table 700).

Although, algorithmically, the second amount should be added to all these values 4-7, the output is actually affected (i.e. the integer part is altered) by the addition of the second amount only in case of value 7, i.e. where all fractional bits of the first value V, in column 4, is set to 1. This is because the fractional bits all need to be 1 in order for the addition to cause a carry to propagate into the least significant integer bit position.

Hence, the output of the addition of the second amount (the integer part of the second value U) is changed with respect to first value V only when all the fractional bits of the first value are set to '1'. Hence in the above code the line L2 can also be implemented as a logic test and a bitwise operation. Conveniently, because the bitwise operation (setting a bit) does not propagate in the same way that a carry from an add operation might, the operation may be made conditional only on the fractional bits of the first value being '1', and not also on the least significant integer bit being '0'. The equivalent code will be as follows:

```
int Divide4AndRoundToNearestOdd_Opt( int x)
{
L11: x++;
L12: if( (x & 0x03) == 0x03 ) x |= 0x04;
L13: return x >> 2;
}
```

In a hardware implementation, once the first step (line L11) is performed, the logic of line L12 may be implemented in VHDL code as given below:

```
if x[1 downto 0] = "11"
then x[2] <= '1';
end if;
```

Thus, rather than performing an addition, line L12 can be implemented as bitwise logic operations i.e. by changing the value of bit 2 of the first value to 1 once its checked if the two LSB's are set to 1.

As a consequence of the same observation, that the integer part of the second value U is changed with respect to the first value V only when all the fractional bits of the first value are set to '1', checking evenness (i.e. whether the bit above the rounding point is a 0 or not) to determine the need to add the second amount can be performed based on the binary number (N) to be rounded rather than the first value and still give the same rounded number result. Viewed another way, in the case that adding the first amount to binary number changes the bit above the rounding point, the first value will have all zero bits below the rounding point, meaning adding the second amount will not change the part of the second value above the rounding point compared to the first value, and so mathematically it doesn't matter whether the binary number or first value is used to determine whether to add the second amount (i.e. because in cases where it would affect whether to add the second amount, it would not change the overall rounding result). In other words, the first value or the binary number can be used as the controlling value for determining whether the value above the rounding point is a 1 bit or a 0 bit.

However, algorithmically and for hardware layout purposes, it may be preferable to have the result of the 'evenness check' (i.e. whether the bit above the rounding point is a zero or one) earlier. So, an alternative scheme could be: on receiving the binary number N, checking the evenness of the integer part of the binary number as the controlling value (assuming integer rounding is to be performed); adding the first amount to obtain the first value; and using the result of checking the evenness of the integer part of the binary number to perform either bit shifting or setting the LSB of the integer part of the first value to 1 based on certain conditions. That means on receiving a binary number (N), first check whether the integer part of the binary number is even and the bit after the rounding point (decimal point) is T. For those numbers where the integer part is even and the bit after the rounding point (decimal point) is '1', set the LSB of the integer part of the first value as '1' (if it is '0' after adding the first amount) and shift or truncate the decimal part to obtain the rounded number. For all other cases, shift the decimal part of the first value to obtain the rounded number. This method provides an advantage and is more hardware friendly as the evenness of the binary number can be checked earlier than checking the evenness of the first value to decide the further steps.

Figure 8:
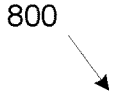
FIG. 8 shows another set of results obtained by performing the unbiased round to odd technique.

FIG. 8 shows another set of results obtained by performing the hardware efficient unbiased rounding technique, when the rounding point corresponds to the radix point such that the technique amounts to an RNO technique; FIG. 8 is a table 800 showing results of the unbiased RNO rounding technique used for rounding a set of numbers. Table 800 in FIG. 8 shows 16 numbers N (in rows numbered 1 to 16) which are rounded using a 'Round to Nearest Odd (RNO)' technique.

Table 800 also shows 16 numbers N both in their decimal format and binary format (columns two and three). The numbers are shown in the binary format having a bit length of 'm' bits. As the rounding point in this example is the radix point, the integer part corresponds to the above-described first portion having a bit length of 'a' bits and the fractional part corresponds to the second portion having a bit length of 'b' bits. Therefore, in the example given in table 800, m=7, a=4, and b=3. The table 800 include numbers between 7 and 9 as an example.

Applying the RNO technique, at step 552, each number for rounding is received (shown in columns two and three of the table 800).

At step 554 a first amount F is added to the number N to obtain a first value V (shown in column four). In this example, as b=3, the second amount S=0.001. Hence the first amount F is calculated as F=0.100–0.001=0.011, i.e. F=⅜ when represented as a fraction. Therefore, the value of the first amount F in binary representation is 0.011.

Thus, at step 554 the first amount F is added to the number N to obtain a first value V. This can be performed, as explained above, using an 'm' bit adder. Alternatively, as discussed above, adding the first amount can be performed by an inbuilt unit performing arithmetic operation in an existing hardware (i.e. by exploiting a unit already present to perform calculations in the existing hardware, before the step of rounding).

Further, at step 556, it is determined if the integer part of the first value V, as the controlling value, is an even number. If not, the first values are provided to the shifter unit at step 559 without adding a second amount to it. As shown in table 800, the second values U corresponding to the numbers N in the rows numbered 1-5 and 14-16 (after step 504, being the binary numbers shown in column four of Table 800) will have odd integer parts which are either 7 or 9. Hence, the second amount is not added to these values and they remain unchanged. In this example the second values of numbers in the rows numbered 1-5 and 14-16 are shown same as their corresponding first value. For these numbers, the first value is provided as an input to the shifter unit.

If at step 556, the determination is 'yes' (i.e. the integer part of V, as the controlling value, is an even number), the method proceeds to step 558 where the second amount S is added to b+1 LSB's of the first value V to obtain a second value U (as shown in column five). In this example, the second amount is 0.001. Again, adding the second amount includes adding al' bit to the LSB of the binary number. This can be performed by another 'b+1' bit adder. The first value V corresponding to the number N in the rows numbered 6-13 (after step 554) will have even integer parts which are 8 as shown in column four of table 800. Hence the second amount is added to 'b+1' LSB's of second values in step 558.

As it is evident from the table 800, during the addition of the second amount only the last 'b+1' bits (4 bits) are altered or changed. This is because the $b^{th}$ bit (or the last bit or the 1's position) of the integer part for an even number is always a '0' bit thereby accommodating any carry or overflowing bit from the addition of the b−1th (or first bit) of the fractional part, without any risk of further overflow to the b+1th bit (because only two numbers are being added).

If the shifter unit receives the first value V as the input, then at step 559, the fractional value of the first value is truncated to perform unbiased rounding of the number. For half of the numbers N (in the rows numbered 1-5 and 14-16), the first value (shown same as the second value of these numbers) is provided as the input to the shifter unit and the fractional part of the first value is truncated, thereby rounding the number to an integer.

If the shifter unit receives the second value U as the input, then at step 560, the fractional value of the second value is truncated to perform unbiased rounding of the number. Thus for the remaining half of the numbers, the second values (corresponding to the values 6-13) obtained after the second step is provided as input to the shifter unit. The fractional part of these second values is truncated (or discarded) thereby rounding the number to an integer.

By doing these steps, as shown in table 800, the values 1-5 (which are less than or equal to 7.5), are rounded to the integer 7 (round to a lower number). The values 6-12 (which are more than 7.5 and less than to 8.5), are rounded to the nearest integer 8. The values 13-16 (values greater than or equal to 8.5) are rounded up to the nearest integer 9.

In this technique, the values 5 and 13, being the numbers 7.5 and 8.5 (which are exactly half-way between two integers), are each rounded to the nearest odd number in this case 7 and 9 respectively. Because, assuming a uniform distribution of numbers, numbers half way between two integers are rounded down 50% of the time (like 7.5) and rounded up 50% of the time (like 8.5), this rounding technique eliminates any bias in the output generated. Thus, using RNO technique a considerable cost in hardware is reduced compared to the RNE technique as the second addition can be realized using a 4 bit adder instead of 7 bit adder, without any increase in bias.

Another example of how the first addition (at step 554) of the hardware efficient rounding technique could be incorporated efficiently into a hardware design can be explained using an implementation of another FIR filter in an existing hardware design.

Consider an example of implementing a 4 tap FIR filter with coefficients ⅛*(1 3 3 1). In this case the output y of the FIR filter at a given timestep is given by the following calculation, where x0 is the sample value at the particular timestep in question, x1 is the sample value for the previous timestep, x2 is the sample value for the timestep before that and so on:

$$y=(x0+3*x1+3*x2+x3)/8$$

It will be necessary to round the result of this calculation. The rounded division by eight may be considered to be equivalent to rounding off three bits from the sum of terms. In accordance with the example described above with respect to FIG. 8, we know that the first amount F of the efficient rounding technique will be three eighths (0.011 in binary) in these circumstances. That first amount F will need to be added to every output of the FIR calculation, during the rounding operation, and so the hardware for performing the FIR calculation can be designed accordingly making it possible to add the first amount F 'cheaply' by exploiting the multiplication at second and third tap of the filter.

For example, among the coefficients 1 3 3 1, the multiplications by the $2^{nd}$ and 3rd coefficient can be unrolled as a multiplication by 2 and an addition as given below.

The output can be realized using a code $$y=\text{Round}(x0+(x1*3)+(x2*3)+x3);$$

In hardware, the multiplies are combined in an order given below. First, before unrolling the multiples into two addition, we obtain $$y=\text{Round}(x0+(x1+x2)*3+x3);$$

Here the values x1 and x2 are multiplied by 3. Hence if we add one to the total being multiplied by 3, we are effectively adding three eighths to the output of the filter. Adding one is cheap if either one of the values x1 and x2 or both values x1 and x2 have an LSB which is zero. In that case the addition of 1 can be obtained by setting the LSB of any of the values having an LSB as '0' bit to a '1' bit. But if both LSBs are already one, the addition of 1 can be achieved by setting the LSB of the sum of x1 and x2 to a '1' bit, as the LSB of the sum will always be zero. Circuitry logic can be configured to add the additional '1' accordingly. Thus, by adding one to x1 and x2, which is the value to be multiplied by 3, we are effectively adding three eighths to the output of the filter by changing the (x1+x2)*3 term to (x1+x2+1)*3.

This is a small/cheap change to the 'pure' multiplication circuitry, but adds a three within the parenthesis of the calculation, which in combination with the division by eight outside the parentheses (represented in the preceding equations by the 'Round' function), amounts to adding ⅜ to the result of the calculation. In other words, this makes it possible, in terms of the rounding technique discussed above, to realize the addition of a ⅜$^{th}$ as the first amount to obtain a first value, without introducing what would otherwise have been a full-width adder to add the first amount to the output of the FIR calculation to perform the first step of the rounding technique.

The following code example uses the described technique to implement a rounded division by eight

```
// Input: integer value x to be divided by 8 and rounded to an integer
int Divide8AndRoundToNearestOdd( int x )
{
L21: x += 3;                // always add a three eights
L22: if ((x & 0x08) == 0) x++;     // add another eighth 50% of the time
L23: return x >> 3;         // truncate the 3 LSBs
}
```

Instead of using the test at L22 to perform the second addition in 50% of cases, the following VHDL code given below may be applied to the output obtained after the first step:

```
if x[2 downto 0] = "111"
   then x[3] <= '1';
end if;
```

This further reduces the hardware cost of L22, by implementing that line using bitwise logic operations rather than an adder.

So as discussed earlier, an alternative scheme could be: on receiving the binary number N, checking the evenness of the integer part of the binary number (assuming integer rounding is to be performed); receiving the binary number N add the first amount to obtain the first value. Instead of checking the evenness of the first value, the same result could be obtained by checking the evenness of the integer part of the binary number and performing either bit shifting or setting the LSB of the integer part of the first value to 1 based on certain conditions. That means on receiving a binary number (N), first check whether the integer part of the binary number is even and the bit after the rounding point (decimal point) is T. For those numbers where the integer part is even and the bit after the rounding point (decimal point) is '1', set the LSB of the integer part of the first value as '1' (if it is '0' after adding the first amount) and shift or truncate the decimal part to obtain the rounded number. For all other cases, shift the decimal part of the first value to obtain the rounded number. This method provides an advantage and is more hardware friendly as the evenness of the binary number can be checked earlier than checking the evenness of the first value to decide the further steps.

Figures 9, 10:
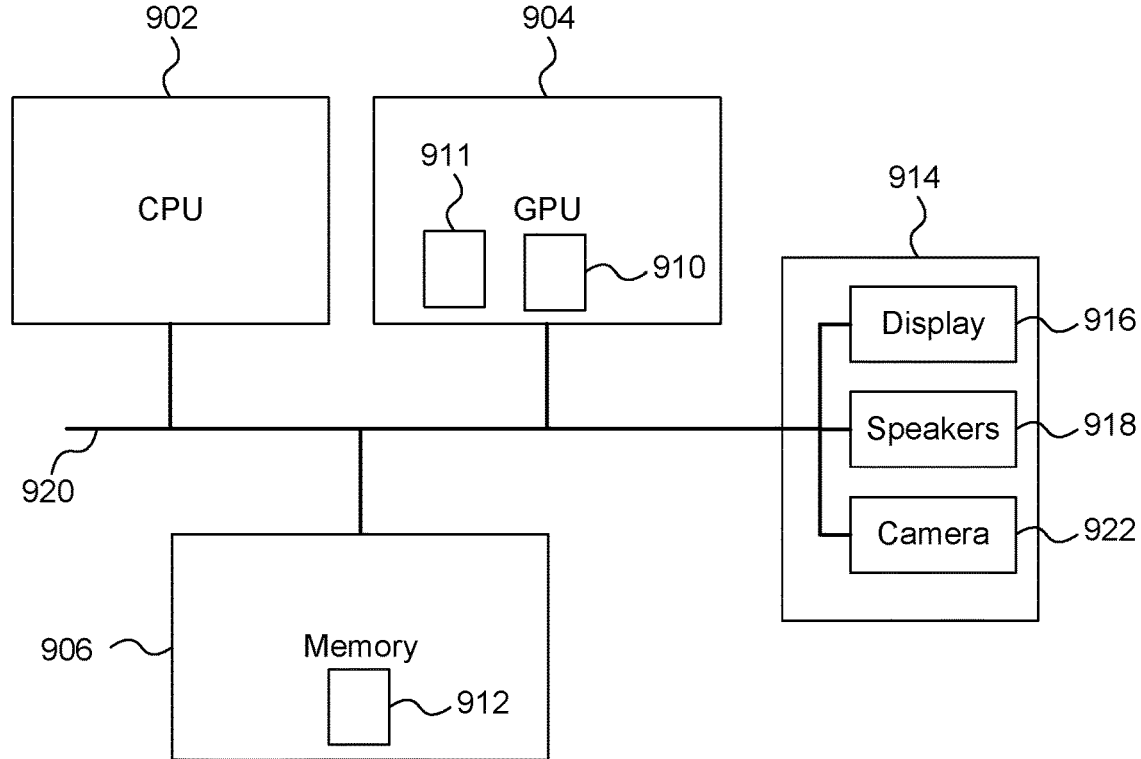
FIG. 9 shows yet another set of results obtained by performing the unbiased round to odd technique.
FIG. 10 shows a computer system in which a hardware implementation for performing an unbiased rounding of a number is implemented.

FIG. 9 shows another set of results obtained by performing the unbiased RNO technique; FIG. 9 shows the results of a case when the number of fractional bits b=1. This is the only case where the value of the second amount S would be s=0.1 i.e. ½. In this case the value of first amount F=0.

In this example, only the addition of second amount to the number N needs to be explicitly implemented in hardware (because the addition of zero requires no additional hardware) for those numbers whose integer part is an even number to obtain the second value. The addition can be performed by a 'b+1' bit adder (or logic test, see below). Further the second value U thus obtained is provided to a shifter unit to discard the fractional bit. For those numbers whose integer part is an odd number, the fractional part is discarded to round the number.

As shown in table 900, the numbers 7.5 and 8.5 (in the rows numbered 2 and 4 which are exactly half-way between two integers, are rounded to their nearest odd number, in this case 7 and 9 respectively, and again this avoids bias in the output generated.

As discussed in detail in FIG. 4-6 and as is evident in the example provided in FIG. 7-8, the addition of the second line of the code (i.e. adding the second amount to the first value), e.g. line L32 below, can be realized using a b+1 bit adder while performing the RNO technique.

The method explained above can be achieved by using a code to implement a rounded division by two as given below:

```
// Input: integer value x to be divided by 2 and rounded to an integer
int Divide2AndRoundToNearestOdd( int x )
{
L32: if ((x & 0x02) == 0) x++;     // add a half 50% of the time
L33: return x >> 1;                // truncate the LSB
}
```

Also, instead of using the test at L32 to perform the addition in 50% of cases, the effect of line L32 can be obtained by the alternate VHDL code given below:

```
if x[0] = "1"
   then x[1] <= '1';
end if;
```

This further reduces the hardware cost of L32 to (almost) zero by implementing that line using bitwise logic operations rather than an adder.

The same result could be obtained by checking the evenness of the integer and performing either bit shifting or setting the LSB of the binary number to 1 as discussed earlier. So, an alternative scheme could be: on receiving a binary number with only one decimal place, first check whether the integer part of the binary number is even and the number after the rounding point (decimal point) is '1'. For those numbers where the integer part is even and the number after the rounding point (decimal point) is '1', set the LSB of the integer part as '1' and shift or truncate the decimal part to obtain the rounded number. For all other cases, shift the decimal part to obtain the rounded number.

Hence, in a general example, the output of the addition of the second amount (e.g. the integer part of second value U) is changed (e.g. with respect to first value V) only when all the fractional part of the first value is set to '1'. Therefore, once the first step (e.g. line L1, L21, or L31) is performed, then the conditional addition of the second amount (e.g. line L2, L22, or L32), may be replaced with bitwise logical operations such as

```
if x[b−1 downto 0] = "11...1"
   then x[b] <= '1';
end if;
```

Thus line 2 can be achieved by changing the value of $b^{th}$ LSB of the first value to 1 if the b LSB's (fractional bits) are set to 1.

In FIGS. 7, 8 and 9, the elimination of bias in the output can be seen, for example, in the average (mean) value of the rounded integer values, which is same as the average value of the input decimal values.

FIG. 10 shows a computer system in which the graphics processing systems described herein may be implemented. The computer system comprises a CPU 902, a GPU 904, a memory 906 and other devices 914, such as a display 916, speakers 918 and a camera 922. A hardware implementation for performing an unbiased rounding of a number 910 (corresponding to a hardware implementation 400 or 600) is implemented on the GPU 904, as well as a Neural Network Accelerator (NNA) 911. In other examples, the hardware implementation 910 may be implemented on the CPU 902 or within the NNA 911. The components of the computer system can communicate with each other via a communications bus 920.

While FIG. 10 illustrates one implementation of a graphics processing system, it will be understood that a similar block diagram could be drawn for an artificial intelligence accelerator system—for example, by replacing either the CPU 902 or the GPU 904 with a Neural Network Accelerator (NNA) 911, or by adding the NNA as a separate unit. In such cases, again, the hardware implementation 910 can be implemented in the NNA.

The hardware implementation of FIGS. 4 and 6 are shown as comprising a number of functional blocks. This is schematic only and is not intended to define a strict division between different logic elements of such entities. Each functional block may be provided in any suitable manner. It is to be understood that intermediate values described herein as being formed by a hardware implementation 400 or 600 need not be physically generated by the hardware implementation 400 or 600 at any point and may merely represent logical values which conveniently describe the processing performed by the hardware implementation 400 or 600 between its input and output.

The hardware implementation 400 or 600 described herein may be embodied in hardware on an integrated circuit. The hardware implementation 400 or 600 described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a hardware implementation 400 or 600 configured to perform any of the methods described herein, or to manufacture a hardware implementation 400 or 600 comprising any apparatus described herein. An integrated circuit definition dataset may be, for example, an integrated circuit description.

Therefore, there may be provided a method of manufacturing, at an integrated circuit manufacturing system, a hardware implementation 400 or 600 as described herein. Furthermore, there may be provided an integrated circuit definition dataset that, when processed in an integrated circuit manufacturing system, causes the method of manufacturing a hardware implementation 400 or 600 to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a hardware implementation 400 will now be described with respect to FIG. 11.

Figure 11:
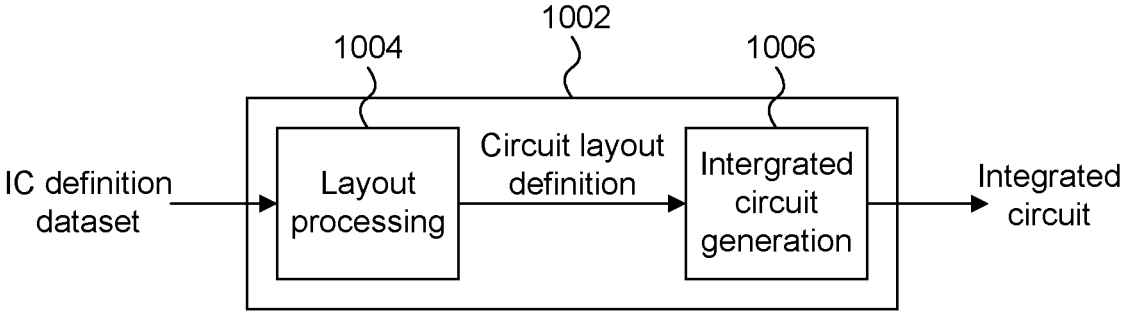
FIG. 11 shows an integrated circuit manufacturing system for generating an integrated circuit embodying a hardware implementation for performing an unbiased rounding of a number.

FIG. 11 shows an example of an integrated circuit (IC) manufacturing system 1002 which is configured to manufacture a hardware implementation 400 or 600 as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a hardware implementation 400 or 600 as described in any of the examples herein), process the IC definition dataset, and generate an IC according to the IC definition dataset (e.g. which embodies a hardware implementation 400 or 600 as described in any of the examples herein). The processing of the IC definition dataset configures the IC manufacturing system 1002 to manufacture an integrated circuit embodying a hardware implementation 400 or 600 as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a hardware implementation 400 or 600 without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 11 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 11, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of processing an input value to a processing system, said input value comprising a number representing data, the method comprising:

receiving, at a first adder implemented in hardware logic, the number in a binary format with a bit length of m bits, having a first portion with bit length of 'a' bits and second portion with bit-length of 'b' bits, wherein the first portion comprises bits of the number above a rounding point and the second portion comprises bits of the number after the rounding point;

performing a hardware efficient unbiased rounding of the number by:

adding, by the first adder, a first amount to the number to obtain a first value;

determining if the bit above the rounding point for a controlling value is '0' bit or a '1' bit, wherein the controlling value is either the received number in the binary format or the first value;

if the bit above the rounding point for the controlling value is a '0' bit, adding, by a second adder implemented in hardware logic, a second amount to 'b+1' LSBs of the first value to obtain a second value and truncating the last b bits of the second value by a shifter implemented in hardware logic; or if the bit above the rounding point for the controlling value is a '1' bit, truncating the last b bits of the first value by said shifter;

wherein the first amount and the second amount to be added are determined based on the number of 'b' bits of the second portion and wherein the first value and the second value are represented in the same binary format as the received number; and outputting the truncated value from the shifter to the processing system to facilitate processing of said number by the processing system.

2. The method according to claim 1, wherein the value of the second amount is the value of the LSB of the second portion.

3. The method according to claim 1, wherein adding the second amount comprises adding a '1' to the LSB of the first value.

4. The method according to claim 1, wherein the first amount is the difference between the value of position of MSB of the second portion and the second amount, such that when b=1, the first amount is zero.

5. The method according to claim 1, wherein adding the second adder is a 'b+1' bit adder.

6. The method according to claim 1, wherein the first value and the second value are having the same 'a−1' MSBs.

7. The method according to claim 1, wherein adding a second amount to 'b+1' LSBs of the first value generates an intermediate value having a bit length of 'b+1' bits.

8. The method according to claim 6, wherein the second value is obtained by combining 'a−1' MSBs of the first value and 'b+1' bits of the intermediate value.

9. The method according to claim 1, wherein the received number has an integer part and a fractional part.

10. The method according to claim 9, wherein the first portion of 'a' bits comprises bits of the integer part and none, one or more MSBs of the fractional part to which the number needs to be rounded.

11. The method according to claim 1, wherein the first adder is a 'm' bit adder.

12. A non-transitory computer readable storage medium having stored thereon computer readable code configured to cause the method of claim 1 to be performed when the code is run on at least one processor.

13. An efficient hardware implementation for processing an input value to a processing system, said input value comprising a number representing data, the hardware implementation performing unbiased rounding and comprising:

a first adder implemented in hardware logic configured to:

receive said number in binary format with a bit length of m bits, having a first portion with bit length of 'a' bits and a second portion with bit-length of 'b' bits, the first portion comprises bits of the number before a rounding point and the second portion comprises bits of the number after the rounding point, and add a first amount to the number N to obtain a first value;

a second adder implemented in hardware logic configured to add a second amount to 'b+1' LSBs of the first value to obtain a second value, wherein the second amount is added if the bit above the rounding point for the first value is a '0' bit;

wherein the first amount and the second amount to be added is determined based on the bit length 'b' bits of the second portion;

a shifter implemented in hardware logic configured to:

shift the second value by 'b' bit to the LSB side if the bit above the rounding point for the first value is a '0' bit, or shift the first value by 'b' bit to the LSB side if the bit above the rounding point for the first value is a '1' bit; and said shifter being further configured to output the shifted value to the processing system to facilitate processing of said number by the processing system.

14. The hardware implementation according to claim 13, wherein the first adder is an m-bit adder.

15. The hardware implementation according to claim 13, wherein the second adder is a 'b+1' bit adder.

16. The hardware implementation according to claim 13, wherein the shifter is implemented by hard wiring the wires from the second adder or the first adder.

17. The hardware implementation according to claim 13, wherein the first adder is integrated with an in-built adder in a logic in the hardware producing the number to be rounded, and optionally wherein the logic is a Finite Impulse Response (FIR) filter used in image processing.

18. The hardware implementation according to claim 13, wherein the second adder adds the second amount by adding '1' to the LSB of the first value.

19. The hardware implementation according to claim 13, wherein the first adder adds the first amount which is the difference between the value of the MSB of the second portion and the second amount.

20. A non-transitory computer readable storage medium having stored thereon an integrated circuit dataset description that when processed by an integrated circuit manufacturing system causes the integrated circuit manufacturing system to manufacture the hardware implementation as set forth in claim 13.

* * * * *